Dec. 25, 1923.
G. H. KING
1,478,438
PROCESS OF MIXING AND DELIVERING OIL AND ALUMINUM CHLORIDE
Filed Nov. 12, 1921
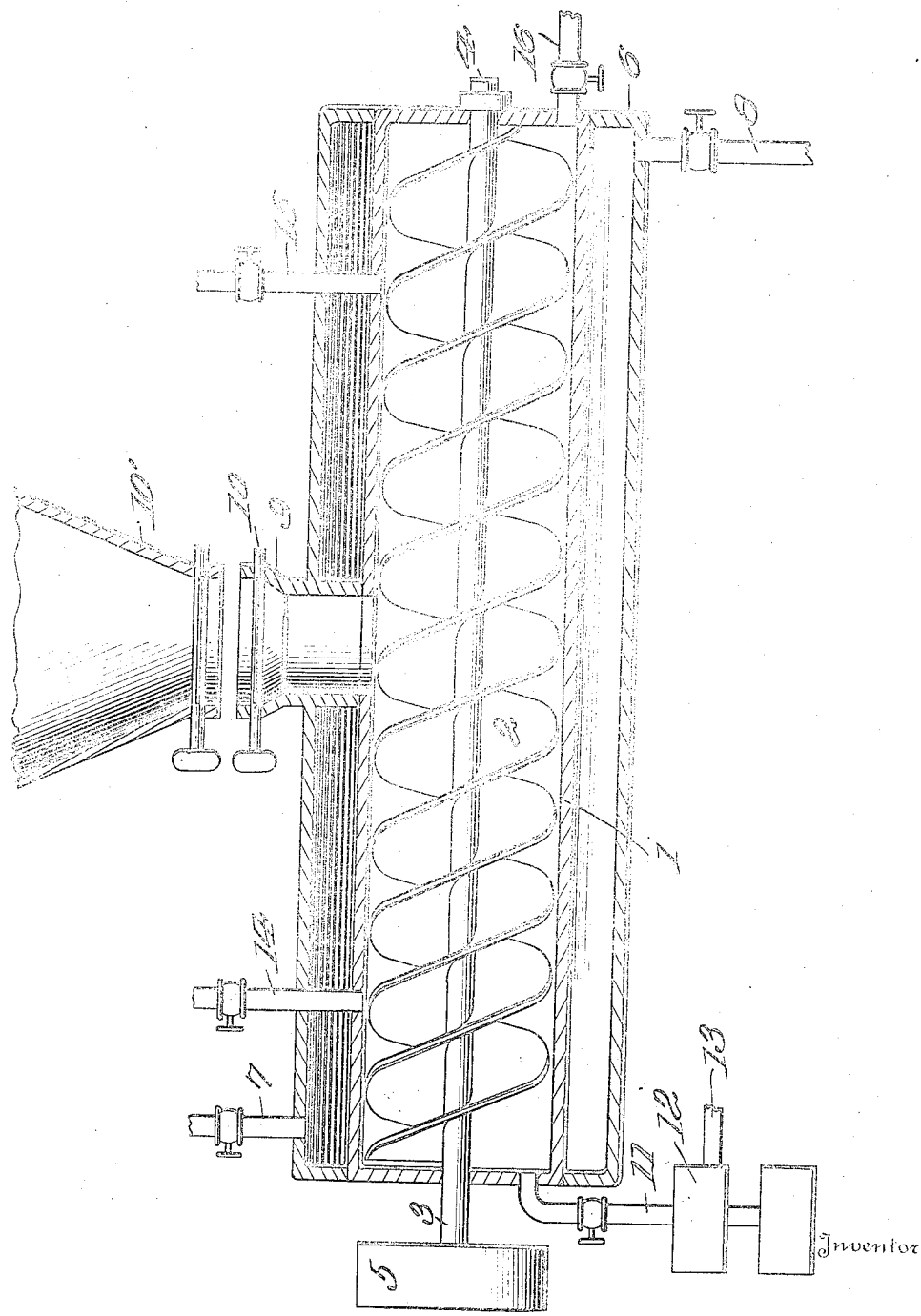
George H. King.
By K. P. McElroy, Attorney Patented Dec. 25, 1923.

1,478,438

UNITED STATES PATENT OFFICE.

GEORGE H. KING, OF PORT ARTHUR, TEXAS, ASSIGNOR TO GULF REFINING COMPANY, OF PITTSBURGH, PENNSYLVANIA, A CORPORATION OF TEXAS.

PROCESS OF MIXING AND DELIVERING OIL AND ALUMINUM CHLORIDE.

Application filed November 12, 1921. Serial No. 514,668.

*To all whom it may concern:*

Be it known that I, GEORGE H. KING, a citizen of the United States, residing at Port Arthur, in the county of Jefferson and State of Texas, have invented certain new and useful Improvements in Processes of Mixing and Delivering Oil and Aluminum Chloride, of which the following is a specification.

This invention relates to processes of mixing and delivering oil and aluminum chloride and it comprises a process of mixing oil and aluminum chloride to form a magma to be used as a charge for treatment of high boiling oils, and forcing said charge to a point of use by a current of oil of the same character as that in the charge, the oil and aluminum chloride originally being supplied to a mixing chamber, stirred therein and the current of oil for delivering the mixture from the chamber being supplied by an oil pump located outside of the chamber, all as more fully hereinafter set forth and as claimed.

Anhydrous aluminum chloride is used in several arts and particularly in the art of treating high boiling petroleum hydrocarbons. Lubricating oil may be warmed with anhydrous aluminum chloride with a resultant improvement in the color of the oil, and higher boiling hydrocarbons such as gas oil, kerosene and the like may be distilled in the presence of anhydrous aluminum chloride under certain precautions with resultant formation of sweet saturated gasoline.

It is advantageous in treating high boiling hydrocarbons with anhydrous aluminum chloride to supply the aluminum chloride, (usually around 5 per cent) in the form of a mixture of aluminum chloride and oil, usually the oil to be treated with the aluminum chloride. This is for the purpose of ease in handling and measurement of proportions of oil and aluminum chloride. The handling of this magna or charge is a difficult matter, because necessarily a pump or similar device must be employed for delivering the magma to the point of use. Anhydrous aluminum chloride per se does not attack, to any material extent, iron or steel vessels which are usually used; but it is a difficult matter in pumping anhydrous aluminum chloride in admixture with oil to keep it entirely out of contact with the air and with moisture. Moisture will hydrate the anhydrous aluminum chloride with a resultant formation of hydrochloric acid which attacks iron and steel and the other materials from which pumps are usually made.

It has been found that pumps used for supplying the magma described corrode to a great extent so that in a relatively short space of time they must be repaired or replaced, this corrosion being due to the formation of hydrochloric acid from the aluminum chloride which, in the pump, comes in contact with moisture, either from the atmosphere or from exhaust steam or the like around the apparatus employed.

It is an object of the present invention to overcome the noted disadvantages and to provide a process of delivering the charge of aluminum chloride and oil to the point of use under sufficient pressure or head without passing the charge through a pump or the like and without exposing the aluminum chloride and its mixture with the oil to the atmosphere or to surrounding influences.

In the accompanying drawing I have shown one form of apparatus in which my process may be carried out, the figure being a longitudinal vertical section with parts in elevation.

Referring to the drawing, 1 indicates the receptacle or mixing chamber which is advantageously circular in cross section, although not necessarily so, and which is provided interiorly with a mixing device 2 in the form of an Archimedean screw carried by the shafts 3 and 4 suitably journaled in the end walls of the receptacle, the shaft 3 being driven by pulley 5 operated from a source of power, not shown. The chamber is advantageously provided with a heating jacket 6, steam or other heating medium being supplied through inlet 7 and removed through outlet 8. The receptacle is provided at the top with the hopper 9 normally sealed by the closure 10 which may be a sliding gate or the like, and the hopper is located under the discharge chute 10' leading from an aluminum chloride storage tank or aluminum chloride producing apparatus, not shown. In communication with the receptacle 1 by means of the valved line 11 is the pump 12 having oil inlet 13. The receptacle 1 may also be provided with oil inlets 14 and outlet 15.

In operation, the correct amount of aluminum chloride, calculated usually by weight, from the discharge chute 10' is delivered through the hopper 9 into the chamber 1. The chamber may be maintained at or around 150° Fahrenheit by means of the heating jacket. The correct amount of oil for the charge may be supplied by means of pump 12 through the line 11, or in order that there may be quicker or better distribution of the oil, it may be supplied through the inlets 14 and 15, connected to the pump, connections not being shown. The stirring mechanism 2 is operated until the aluminum chloride and oil are thoroughly mixed whereupon, either while the stirrer is continued in operation, or after it has been stopped, the pump 12 is put into operation. At the end of the receptacle there is a magma outlet 16 which leads to the point of use of the mixture. Oil pumped in by pump 12 will force the charge from the receptacle to the point of use.

I have found it is advantageous to operate intermittently, that is to say, I may supply the mixing chamber with the calculated amount of aluminum chloride and oil, mix the same and then deliver to the point of use as described; any oil remaining in the receptacle 1 being used for the next charge of aluminum chloride, supplemented with additional oil if necessary. But under some conditions, particularly, for instance, where several stills are to be supplied with the magma of aluminum chloride and the oil, or where the treatment of higher boiling oils with aluminum chloride is being carried out in a continuous manner, I may operate my mixing and delivering apparatus continuously, feeding the aluminum chloride and oil in regulated proportions to the chamber while constantly supplying a current of oil by means of the pump to carry the charge to the point of use.

It may be noted that the aluminum chloride does not come in contact with the pump or with any moving mechanism, and that any foreign matter, such as particles of fire brick and the like, which by chance may be delivered to the receptacle do not pass through the pump and interfere with its operation.

What I claim is:—

1. The process of mixing and delivering oil and aluminum chloride which comprises mixing hydrocarbon oil and aluminum chloride in a closed receptacle, establishing communication between the receptacle and a point to which the aluminum chloride and oil mixture is to be delivered, and delivering the said mixture to said point by forcing into the chamber, oil of the same character as that mixed with the aluminum chloride.

2. The process of mixing and delivering hydrocarbon oil and aluminum chloride which comprises mixing the same to form a charge and forcing said charge to a point of use by a current of oil of the same character as that in the charge.

3. The process of mixing and delivering oil and aluminum chloride which comprises mixing the same to form a charge and forcing said charge to a point of use by a current of oil.

4. The process of mixing and delivering hydrocarbon oil and aluminum chloride which comprises mixing such oil and aluminum chloride in a closed receptacle, heating the mixture therein, establishing communication between the receptacle and a point at which the aluminum chloride and oil are to be delivered, and delivering said heated mixture to said point by forcing into the chamber oil of the same character as that mixed with the aluminum chloride.

In testimony whereof, I have hereunto affixed my signature.

GEORGE H. KING.